US012566403B2

(12) United States Patent
Ishida

(10) Patent No.: US 12,566,403 B2
(45) Date of Patent: Mar. 3, 2026

(54) IMAGE FORMING APPARATUS WITH DETACHABLE EXTERNAL UNITS

(71) Applicant: CANON KABUSHIKI KAISHA, Tokyo (JP)

(72) Inventor: Toshiki Ishida, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/903,530

(22) Filed: Oct. 1, 2024

(65) Prior Publication Data

US 2025/0110440 A1 Apr. 3, 2025

(30) Foreign Application Priority Data

Oct. 3, 2023 (JP) ................................ 2023-172273

(51) Int. Cl.
*G03G 15/00* (2006.01)
*G03G 21/16* (2006.01)

(52) U.S. Cl.
CPC ......... *G03G 15/80* (2013.01); *G03G 21/1647* (2013.01); *G03G 21/1652* (2013.01)

(58) Field of Classification Search
CPC ............... G03G 15/80; G03G 21/1619; G03G 21/1647; G03G 21/1652; B65H 1/266
See application file for complete search history.

(56) References Cited

U.S. PATENT DOCUMENTS

| | | | | |
|---|---|---|---|---|
| 2006/0105603 A1 | 5/2006 | Nishio | | |
| 2013/0195503 A1* | 8/2013 | Nakagaki | G03G 21/1619 | 399/107 |
| 2014/0001696 A1* | 1/2014 | Yoshida | B65H 1/266 | 271/9.01 |

FOREIGN PATENT DOCUMENTS

| | | | |
|---|---|---|---|
| EP | 2610065 A1 * | 7/2013 | G03G 21/1647 |
| JP | 2000132052 A | 5/2000 | |
| JP | 2022126270 A | 8/2022 | |

* cited by examiner

*Primary Examiner* — Sophia S Chen
(74) *Attorney, Agent, or Firm* — Canon U.S.A., Inc. IP Division

(57) ABSTRACT

An image forming apparatus includes a first housing and a second housing connected to each other, a first connector unit disposed on the first housing and including a first terminal unit and a first supporting unit that supports the first terminal unit, a second connector unit disposed on the second housing and including a second terminal unit that is electrically connected to the first terminal unit by being engaged with the first terminal unit in a first direction and a second supporting unit that supports the second terminal unit, a first elastic member connected between the first terminal unit and the first supporting unit or between the first supporting unit and the first housing, and a second elastic member connected between the second terminal unit and the second supporting unit or between the second supporting unit and the second housing.

10 Claims, 12 Drawing Sheets

IMAGE FORMING APPARATUS WITH DETACHABLE EXTERNAL UNITS

BACKGROUND

Field

The present disclosure relates to an image forming apparatus having an external unit that is attachable to and detachable from the main body of the image forming apparatus.

Description of the Related Art

There has conventionally been proposed an image forming apparatus having an external unit attachable to and detachable from its main body.

The apparatus main body and the external unit are not only physically connected to each other via their housings but also electrically connected to each other via their connectors including connection terminals (Japanese Patent Application Laid-Open No. 2022-126270). In the apparatus discussed in Japanese Patent Application Laid-Open No. 2022-126270, when the external unit is mounted on the apparatus main body, to position the connector of the apparatus main body and the connector of the external unit within a range where the connectors can be fitted to each other, one of the connectors is movably provided with respect to the other connector.

SUMMARY

According to some embodiments, an image forming apparatus configured to form an image on a recording material is disclosed. The image forming apparatus includes: a first housing and a second housing connected to each other; a first connector unit disposed in the first housing and including a first terminal unit and a first supporting unit configured to support the first terminal unit; a second connector unit disposed in the second housing and including a second terminal unit electrically connected to the first terminal unit by being engaged with the first terminal unit in a first direction and a second supporting unit configured to the second terminal unit; a first elastic member connected between the first terminal unit and the first supporting unit or between the first supporting unit and the first housing; and a second elastic member connected between the second terminal unit and the second supporting unit or between the second supporting unit and the second housing.

Further features of the present disclosure will become apparent from the following description of exemplary embodiments with reference to the attached drawings.

DESCRIPTION OF THE EMBODIMENTS

<Image Forming Apparatus>

Hereinafter, various exemplary embodiments, features, and aspects of the present disclosure will be described with reference to the drawings. When the external unit is mounted on the apparatus main body, if there is an inclination between the apparatus main body and the external unit, a contact failure could occur between the connection terminals in the apparatus main body and the external unit after the mounting, or the connectors could break. The present disclosure has been made in view of the above issues and is directed to providing an image forming apparatus in which a connector of the apparatus main body and a connector of an external unit can be appropriately fitted to each other even when there is an inclination between the apparatus main body and the external unit when the external unit is mounted on the apparatus main body.

Figure 1:
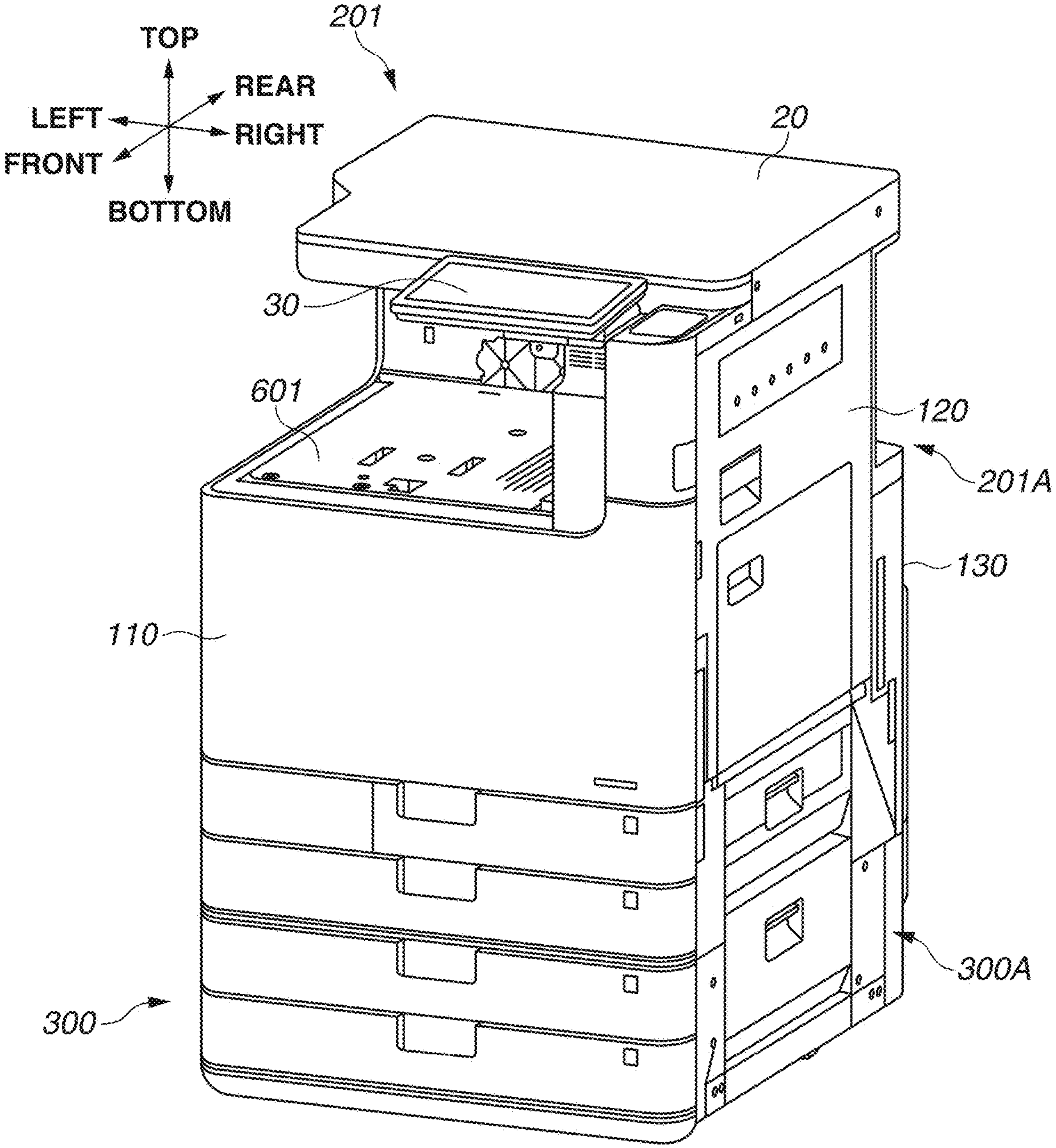
FIG. 1 is a perspective view of an image forming apparatus according to an exemplary embodiment.
Figure 2:
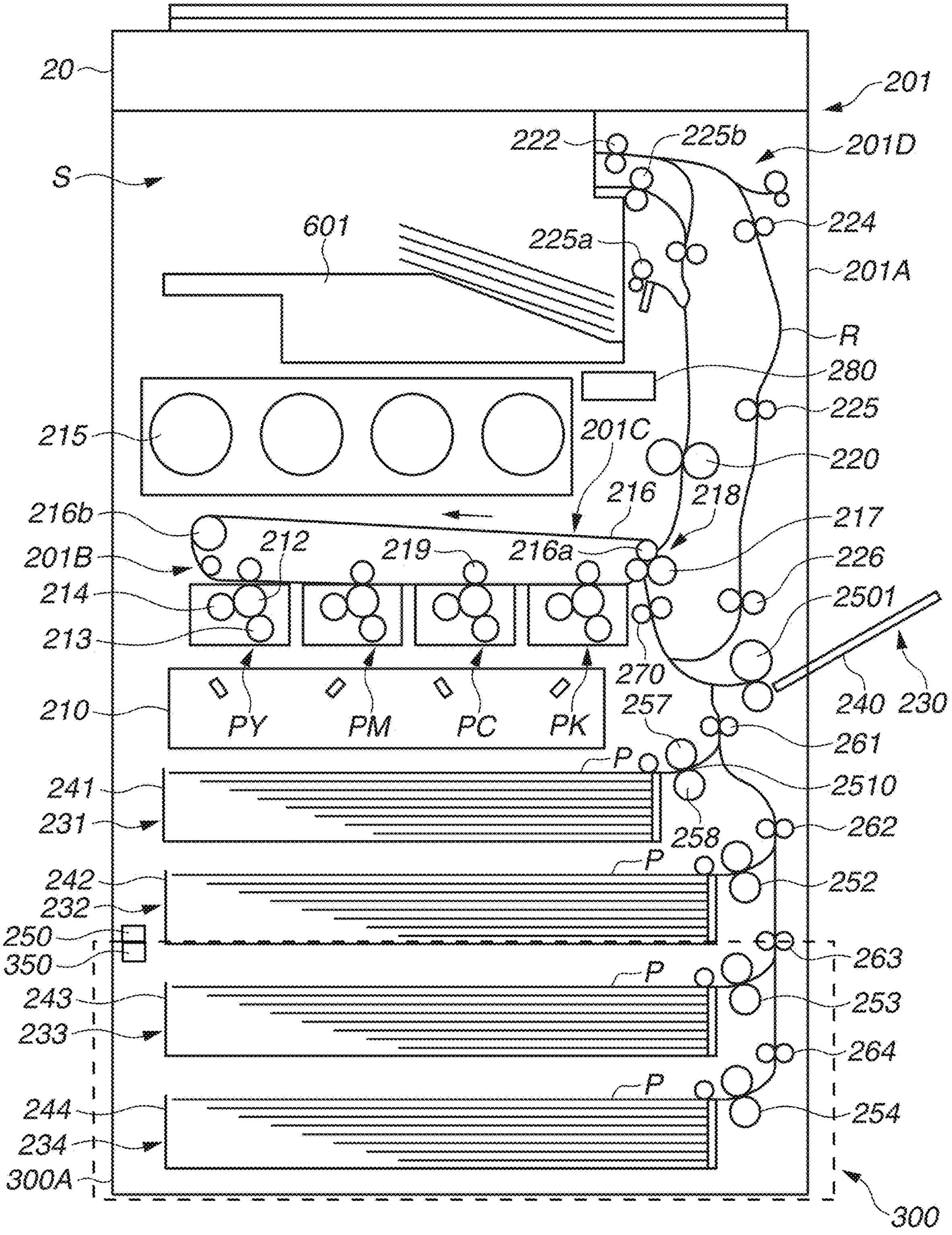
FIG. 2 schematically illustrates the structure of the image forming apparatus on which a sheet storage apparatus is mounted.

First, an image forming apparatus according to the present exemplary embodiment will be described with reference to FIGS. 1 and 2. As illustrated in FIG. 1, an image forming apparatus 201 according to the present exemplary embodiment is an in-body-discharge-type image forming apparatus. The image forming apparatus 201 includes a housing 201A and a document reading device 20 that reads document image information, and a discharge tray 601 on which sheets discharged from the housing 201A are stacked is formed between the housing 201A and the document reading device 20. On the front side of the housing 201A, a display unit capable of displaying various kinds of information and an operation unit 30 including keys or the like capable of entering various kinds of information in response to user operations are disposed.

In the present specification, the side on which a user stands when the user operates the operation unit 30 to operate the image forming apparatus 201 will be referred to as “front side (front)”, and the side opposite thereto will be referred to as “rear side (rear)”. Further, the left side when the image forming apparatus 201 is viewed from the front will be referred to as “left”, and the right side when the image forming apparatus 201 is viewed from the front will be referred to as “right”.

The housing 201A is formed by a plurality of sheet metal members such as a front-side plate provided on the front side of the image forming apparatus 201, a rear-side plate provided on the rear side and supporting the units together with the front-side plate, stays connecting the front-side plate and the rear-side plate, support columns supporting the front-side plate, a bottom surface part, etc. The housing 201A is covered by exterior covers forming the exterior of the image forming apparatus 201. As the exterior covers, a front cover 110 is disposed on the front side, side covers 120 are disposed on both left and right sides, and a rear cover 130 is disposed on the rear side.

The image forming apparatus 201 according to the present exemplary embodiment includes a sheet storage apparatus 300 below the housing 201A serving as a second housing. The sheet storage apparatus 300 is an example of an external unit that can be detachably attached to the image forming apparatus 201. The housing 201A can be attached to and detached from a housing 300A of the sheet storage apparatus 300. The sheet storage apparatus 300 can additionally be attached to the housing 201A to supply sheets of various sizes and types stored in large quantity in the housing 300A serving as a first housing to the image forming apparatus 201. The housing 201A and the housing 300A are physically connectable to each other, and the image forming apparatus 201 and the sheet storage apparatus 300 are connected to each other via the housing 201A and the housing 300A.

Next, a schematic structure of the image forming apparatus 201 will be described with reference to FIG. 2. As illustrated in FIG. 2, the image forming apparatus 201 includes an image forming unit 201B that forms a toner image on a sheet P. The image forming unit 201B is an intermediate transfer electrophotographic unit.

The image forming unit 201B includes a laser scanner 210 and four process cartridges PY, PM, PC, and PK for forming toner images of four colors of yellow (Y), magenta (M), cyan (C), and black (K). Each of the process cartridges PY to PK includes a photosensitive drum 212, a charger 213, and a developing device 214. The image forming unit 201B further includes an intermediate transfer unit 201C, which is disposed above the process cartridges PY to PK, and a fixing unit 220. Toner cartridges 215 for supplying toner to the respective developing devices 214 are mounted above the intermediate transfer unit 201C.

The intermediate transfer unit 201C includes an intermediate transfer belt 216 wound around a driving roller 216*a* and a tension roller 216*b*. On the inner side of the intermediate transfer belt 216, primary transfer rollers 219 that are in contact with the intermediate transfer belt 216 are provided at positions facing the respective photosensitive drums 212. The intermediate transfer belt 216 is rotated counterclockwise by the driving roller 216*a* driven by a driving unit (not illustrated).

A secondary transfer roller 217 for transferring the toner image carried on the intermediate transfer belt 216 to the sheet P is provided at a position facing the driving roller 216*a* of the intermediate transfer unit 201C. The fixing unit 220 is provided above the secondary transfer roller 217, and a first discharge roller pair 225*a*, a second discharge roller pair 225*b*, and a double-side reversing part 201D are disposed above the fixing unit 220. The double-side reversing part 201D includes, for example, a reversing roller pair 222 capable of switching between forward and reverse rotation, and a re-conveying path R for conveying the sheet having an image formed on its one side to the image forming unit 201B again.

An image forming operation of the image forming unit 201B will be described. The document reading device 20 reads a document image, and a control unit (not illustrated) performs image processing on the read document image. Next, the processed image is converted into electric signals and transmitted to the laser scanner 210 of the image forming unit 201B. In the image forming unit 201B, the surface of each photosensitive drum 212 is uniformly charged to a potential of a predetermined polarity by the charger 213, a laser light is emitted from the laser scanner 210, and the surface of the rotating photosensitive drum 212 is exposed to the laser light. As a result, electrostatic latent images corresponding to yellow, magenta, cyan, and black images are formed on the surfaces of the photosensitive drums 212 of the process cartridges PY to PK. These electrostatic latent images are first developed and visualized by toners of the respective colors supplied from the developing devices 214 and are then primarily transferred from the photosensitive drums 212 to the intermediate transfer belt 216 by a primary transfer voltage applied to the primary transfer rollers 219.

The image forming apparatus 201 includes a first feeding unit 231 and a second feeding unit 232. The first feeding unit 231 includes a first cassette 241 that stores sheets P and includes a first feeding roller pair 2510 and a first drawing roller pair 261 that feed the sheets P stored in the first cassette 241. The second feeding unit 232 includes a second cassette 242 that stores sheets P, and includes a second feeding roller pair 252 and a second drawing roller pair 262 that feed the sheets P stored in the second cassette 242.

When the sheet storage apparatus 300 is mounted, sheets P are fed to the image forming apparatus 201 from the sheet storage apparatus 300. The sheet storage apparatus 300 includes a third feeding unit 233 and a fourth feeding unit 234. The third feeding unit 233 includes a third cassette 243 that stores sheets P, and includes a third feeding roller pair 253 and a third drawing roller pair 263 that feed the sheets P stored in the third cassette 243. The fourth feeding unit 234 includes a fourth cassette 244 that stores sheets P, and includes a fourth feeding roller pair 254 and a fourth drawing roller pair 264 that feed the sheets P stored in the fourth cassette 244.

The sheet storage apparatus 300 receives power from a power source unit 280 provided in the housing 201A, receives an electric signal for control (hereinafter referred to as a control signal) from a control unit provided in the housing 201A, and supplies sheets P to the image forming apparatus 201. The power source unit 280 is electrically connected to an external commercial power source via a commercial electrical outlet and a power cord (not illustrated), and supplies power from the commercial power source to various units and parts disposed in the housing 201A as well as to the sheet storage apparatus 300.

The cassettes 241 and 242 can store the sheets P, and can be inserted into and drawn from the housing 201A of the image forming apparatus 201. The cassettes 243 and 244 serving as storage bodies can store the sheets P, and can be inserted into and drawn from the housing 300A of the sheet storage apparatus 300. Paper such as plain paper or thick paper, a plastic film such as an overhead projector sheet, cloth, a sheet material such as coated paper on which surface treatment has been performed, or a sheet material having a special shape such as an envelope or index paper can be used as a sheet P serving as a recording material.

Each of the feeding roller pairs (2510, 252 to 254) includes a feeding roller 257 that feeds a sheet P from a corresponding one of the cassettes 241 to 244 and a retard roller 258 that is in contact with the feeding roller 257. Each retard roller 258 receives a driving force in a direction against the rotation of the feeding roller 257 via, for example, a torque limiter. The retard roller 258 applies a frictional force to a sheet P that enters a separation nip between this retard roller 258 and the feeding roller 257, and separates the sheet P conveyed by the feeding roller 257 from another sheet. In this way, each of the feeding roller pairs (2510, 252 to 254) feeds the sheets P in a corresponding one of the cassettes 241 to 244 one by one.

The sheet P fed from any one of the cassettes 241 to 244 by a corresponding one of the feeding roller pairs (2510, 252 to 254) is conveyed toward a registration roller pair 270 via a corresponding one of the drawing roller pairs 261 to 264, which are conveying roller pairs for conveying sheets P. The sheet P fed from one of the cassettes 242 to 244, other than the uppermost cassette, is conveyed upward toward the registration roller pair 270 by being sequentially passed through at least one of the drawing roller pairs 261 to 263 of an upper cassette(s). For example, the sheet P fed from the third feeding unit 233 of the sheet storage apparatus 300 is fed from the third cassette 243 by the third feeding roller pair 253, and is conveyed to the registration roller pair 270 via the third drawing roller pair 263, the second drawing roller pair 262, and the first drawing roller pair 261 in this order. In the present exemplary embodiment, the feeding roller pair 253 and the drawing roller pair 263 constitute a conveying unit for conveying the sheets P stored in the cassette 243 from the housing 300A to the housing 201A, and the feeding roller pair 254 and the drawing roller pair 264 constitute a conveying unit for conveying the sheets P stored in the cassette 244 from the housing 300A to the housing 201A.

The image forming apparatus 201 is provided with a manual feeding unit 230 on which the user can set sheets P as desired. The sheets P set on a manual feeding tray 240 are conveyed one by one toward the registration roller pair 270 by the feeding roller pair 2501 including a feeding roller and a separation roller.

After correcting the skew of a sheet P, the registration roller pair 270 sends the sheet P toward a secondary transfer unit 218 formed between the secondary transfer roller 217 and the intermediate transfer belt 216 based on the start timing of the toner image formation by the image forming unit 201B. In the secondary transfer unit 218, by applying a secondary transfer voltage to the secondary transfer roller 217, a toner image is secondarily transferred from the intermediate transfer belt 216 onto the sheet P. The sheet P on which the toner image is secondarily transferred is conveyed to the fixing unit 220, and the toner image is fixed on the sheet P as heat and pressure is applied to the sheet P by the fixing unit 220.

Thereafter, the sheet P is stacked on the discharge tray 601 disposed at the bottom of a discharge space S by the first discharge roller pair 225*a* or the second discharge roller pair 225*b* provided downstream of the fixing unit 220. In a case where images are to be formed on both sides of the sheet P, the sheet P having an image formed on its first surface is conveyed to the re-conveying path R by the reversing roller pair 222. Next, when the sheet P reaches the registration roller pair 270 again by re-conveying roller pairs 224, 225, and 226 arranged on the re-conveying path R, the sheet P is conveyed to the image forming unit 201B by the registration roller pair 270. After an image is formed on a second surface of the sheet P, the second surface being opposite to the first surface, by the image forming unit 201B, the sheet P is discharged to the discharge tray 601 by the first discharge roller pair 225*a* or the second discharge roller pair 225*b*.

The image forming unit 201B is not limited to the image forming unit using the intermediate transfer method described above. For example, the image forming unit 201B may be an image forming unit using the direct transfer method that directly transfers toner images formed on the photosensitive drums 212 onto a sheet P. Further, the image forming unit 201B may use a method other than an electrophotographic method. An image forming unit using an inkjet method or an offset printing method may be alternatively used.

Figure 5:
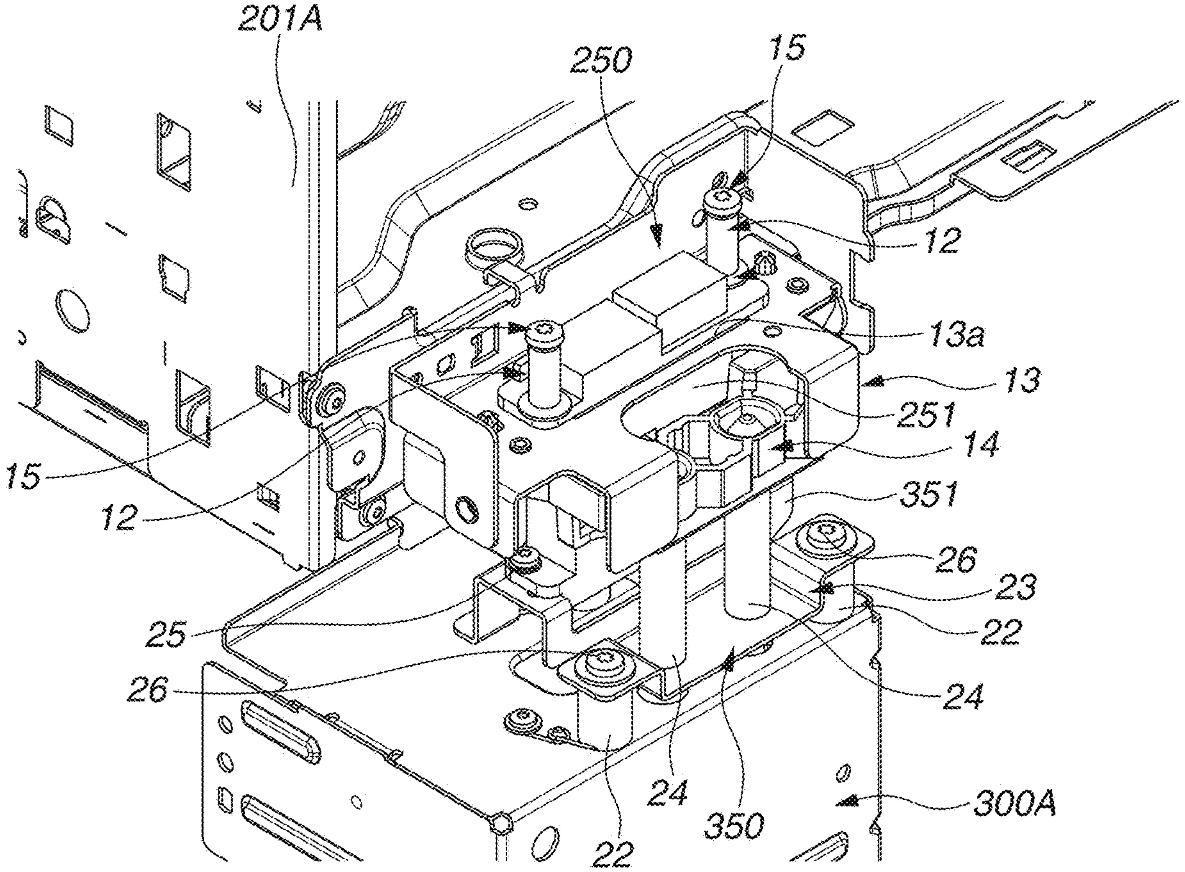
FIG. 5 is a perspective view of the main-body-side connector unit and a unit-side connector unit.
Figure 6:
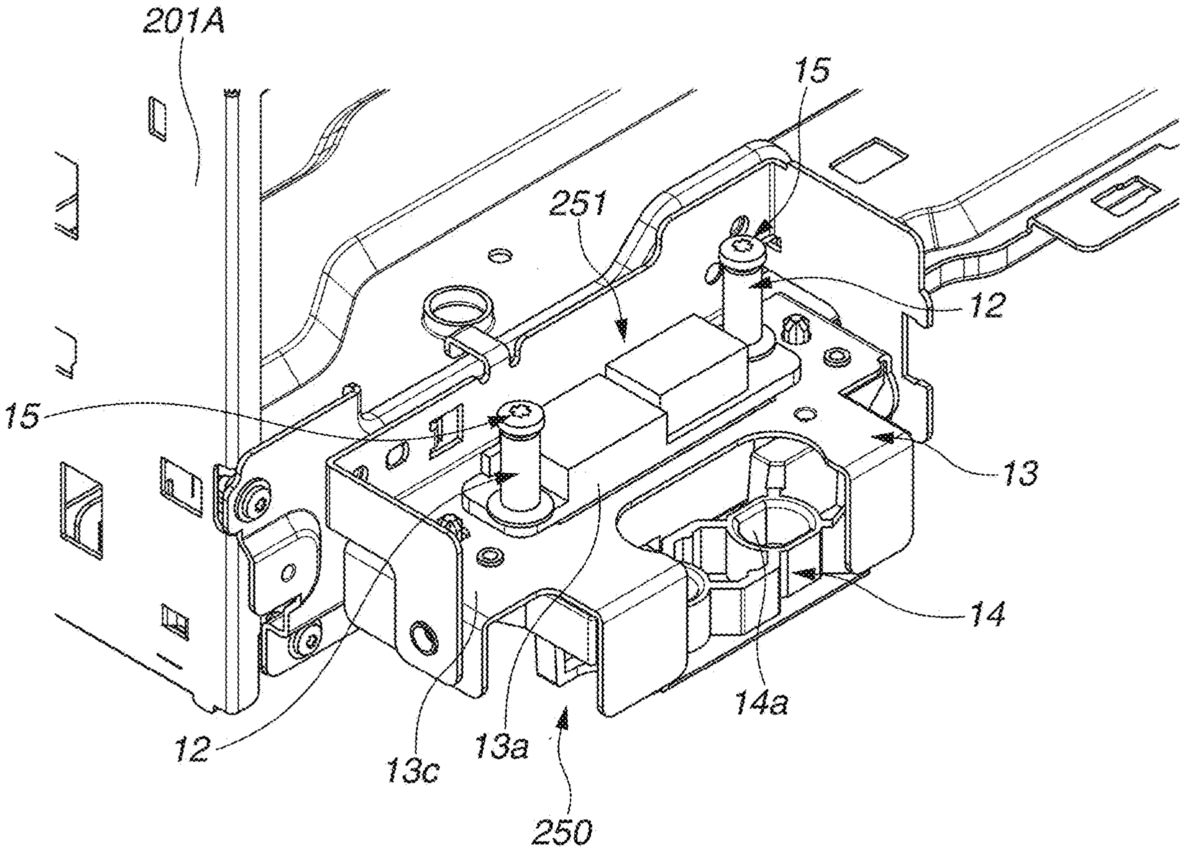
FIG. 6 is an enlarged view of the main-body-side connector unit.
Figure 9:
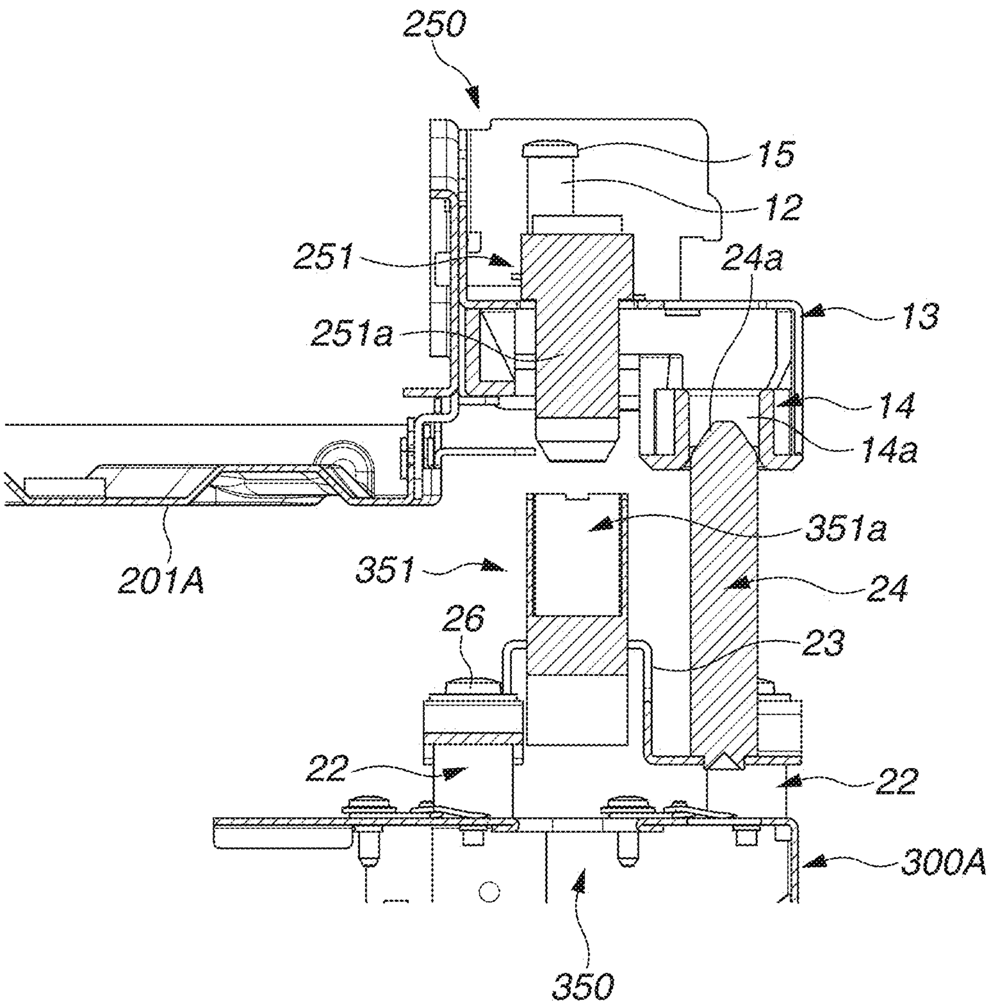
FIG. 9 is a sectional view illustrating a state in which guide pins start to enter guide holes in a case where the main body of the image forming apparatus is not inclined with respect to the main body of the sheet storage apparatus.
Figure 10:
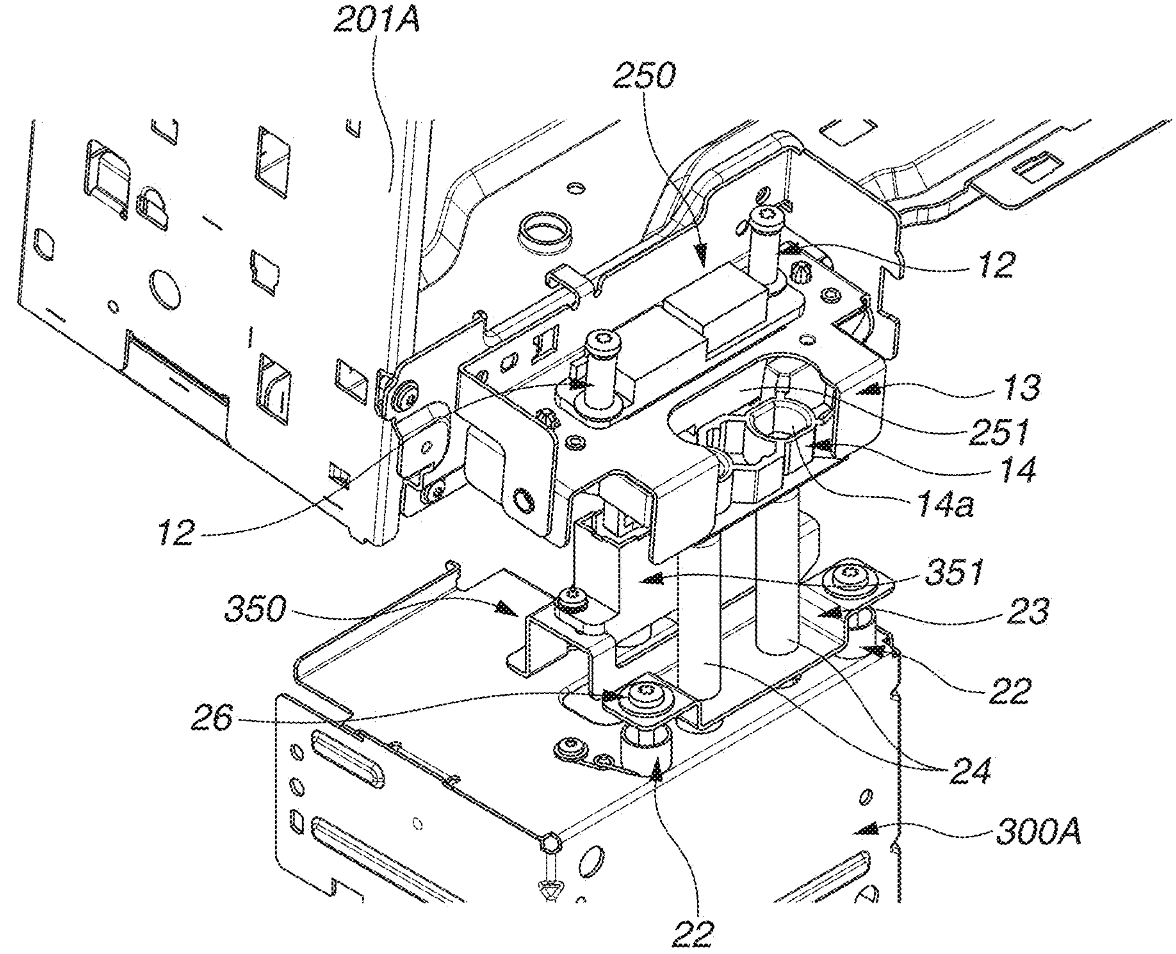
FIG. 10 is a perspective view illustrating a state immediately before the guide pins enter the guide holes in a case where the main body of the image forming apparatus is inclined with respect to the main body of the sheet storage apparatus.

As described above, the sheet storage apparatus 300 can operate by receiving power from the power source unit 280 of the image forming apparatus 201 and receiving a control signal from the control unit (not illustrated) of the image forming apparatus 201. Therefore, the sheet storage apparatus 300 is not only physically connected to the image forming apparatus 201 but also electrically connected to the image forming apparatus 201 such that the sheet storage apparatus 300 can receive power and a control signal from the image forming apparatus 201. In the present exemplary embodiment, the sheet storage apparatus 300 and the image forming apparatus 201 can be electrically connected to each other only by mounting the image forming apparatus 201 on the sheet storage apparatus 300 by an operator without using a connection cable or the like. To this end, the image forming apparatus 201 is provided with a main-body-side connector unit, and the sheet storage apparatus 300 is provided with a unit-side connector unit. Next, the main-body-side connector unit and the unit-side connector unit will be described with reference to FIGS. 2 to 12. In FIGS. 5, 6, and 10, a portion of a main-body-side connector supporting unit 13, which will be described below, is cut out to facilitate the understanding of the description.

Figure 3:
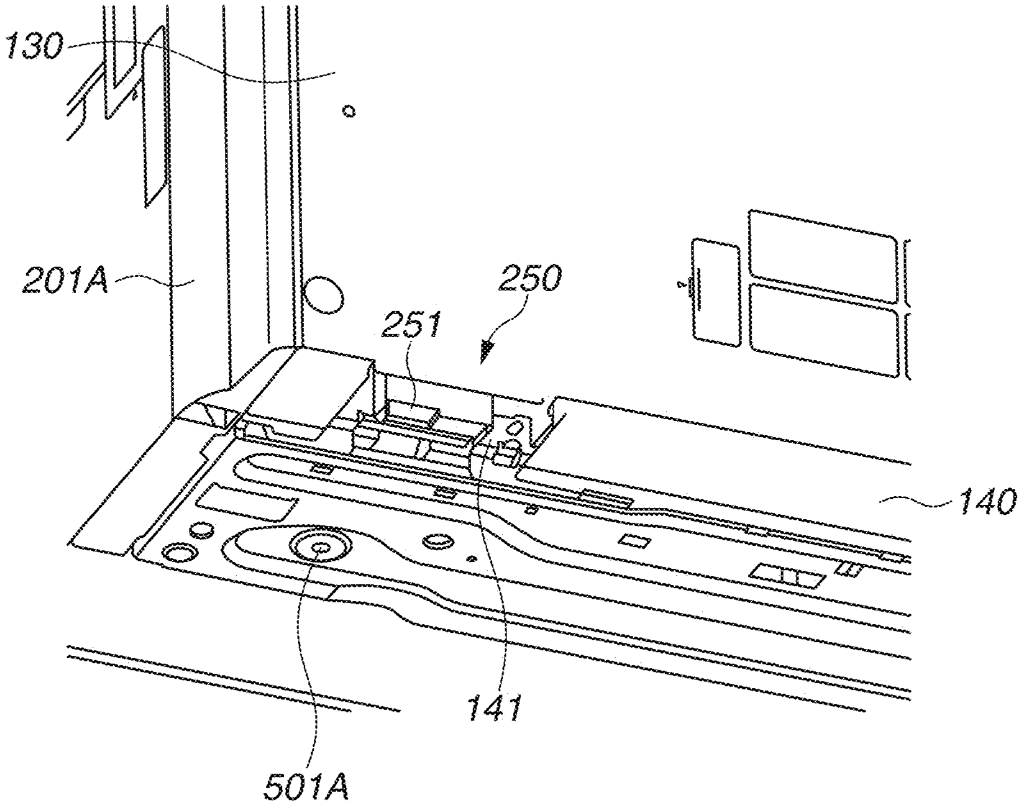
FIG. 3 schematically illustrates a main-body-side connector unit.

As illustrated in FIG. 3, a bottom surface part 140 of the housing 201A has a bottom surface opening 141. A main-body-side connector unit 250 includes a main-body-side terminal unit 251 and is provided on the housing 201A such that a part of the main-body-side terminal unit 251 is exposed from the bottom surface opening 141. The sheet storage apparatus 300 is attached to the bottom surface part 140 of the housing 201A. Therefore, the bottom surface part 140 is provided with a positioning hole 501A through which a positioning pin 500A (see FIG. 4) of the sheet storage apparatus 300 passes.

Figure 4:
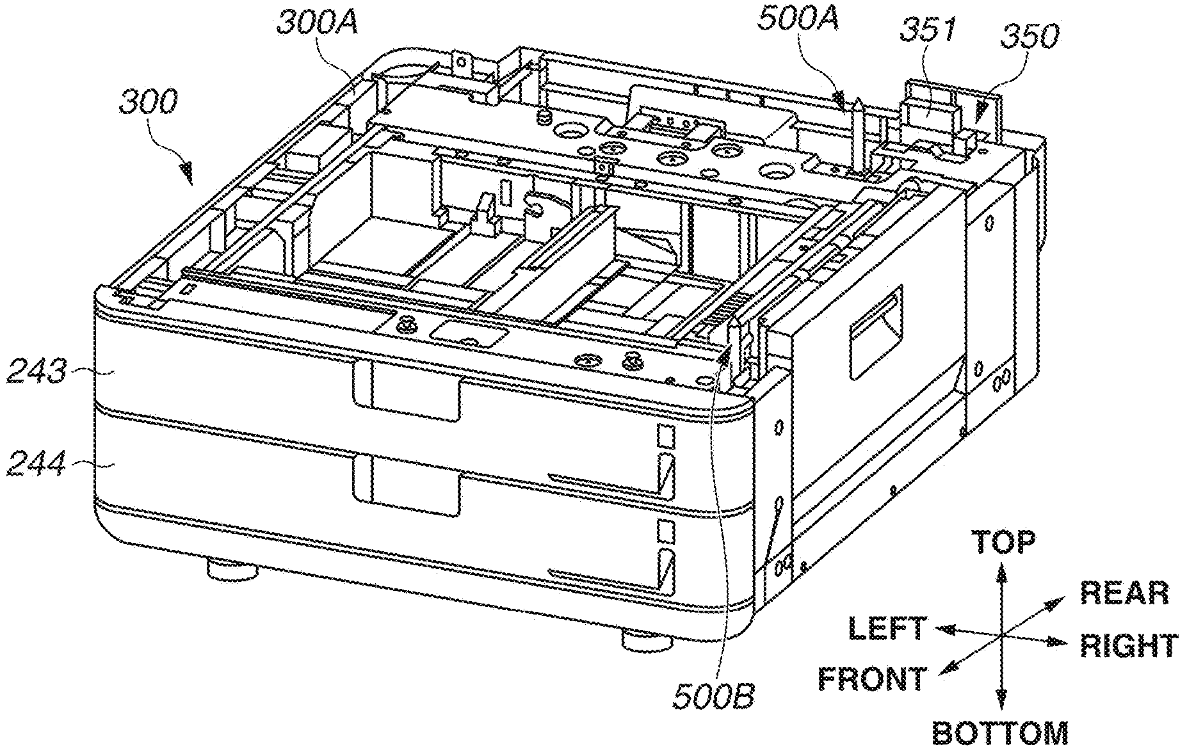
FIG. 4 is a perspective view of the sheet storage apparatus.

As illustrated in FIG. 4, the sheet storage apparatus 300 includes the housing 300A. The housing 300A is provided with the third cassette 243 and the fourth cassette 244 that can be drawn toward the front. The sheet storage apparatus 300 is provided with a unit-side connector unit 350. The unit-side connector unit 350 includes a unit-side terminal unit 351. The unit-side terminal unit 351 and the main-body-side terminal unit 251 (see FIG. 3) can be fitted to each other in a fitting direction (first direction).

Further, the positioning pin 500A is fixed to the upper surface of the housing 300A. When the housing 201A is stacked on the housing 300A, the positioning pin 500A of the housing 300A is fitted into the positioning hole 501A of the housing 201A, and this determines the relative position between the housing 201A and the housing 300A. Similarly, the housing 300A is provided with a positioning pin 500B illustrated in FIG. 4, and the bottom surface part 140 of the housing 201A is provided with a positioning hole (not illustrated). The relative positions between the housing 201A and the housing 300A may be determined in this way by these two sets of positioning pins and positioning holes.

Next, the main-body-side connector unit and the unit-side connector unit will be described. In the present exemplary embodiment, in the unit-side connector unit, a terminal unit is fixed to a supporting unit, and the supporting unit is disposed on the housing 300A via elastic members. Whereas, in the main-body-side connector unit, a terminal unit is disposed on a supporting unit via elastic members, and the supporting unit is fixed to the housing 201A.

<Main-Body-Side Connector Unit>

The structure of the main-body-side connector unit 250 according to the present exemplary embodiment will be described. FIG. 5 is a perspective view of the main-body-side connector unit 250 and the unit-side connector unit 350. FIG. 6 is an enlarged view of the main-body-side connector unit 250. As illustrated in FIGS. 5 and 6, the main-body-side connector unit 250 serving as a second connector unit includes the main-body-side connector supporting unit 13 and the main-body-side terminal unit 251.

The main-body-side connector supporting unit 13 serving as a second supporting unit is fixed to the housing 201A. The term "being fixed" here refers to a state of being connected or engaged in such a manner that the movable range is smaller relative to a state of being connected via an elastic member such as a mechanical spring or rubber. For example, the main-body-side connector supporting unit 13 may be fixed to the housing 201A by fastening with a screw, welding, or bonding with an adhesive. Since the degree of "fixing" here is relative to the state of being connected via the elastic member, connecting by using an elastic member having a sufficiently high elastic coefficient is also one mode of the fixing. Therefore, when the sheet storage apparatus 300 (housing 300A) is mounted on the image forming apparatus 201 (housing 201A), if the housing 201A is inclined with respect to the housing 300A, the main-body-side connector unit 250 is inclined together with the housing 201A. The main-body-side terminal unit 251 serving as a second terminal unit is supported on a mounting surface 13*c* of the main-body-side connector supporting unit 13 with stepped screws 15 disposed at two positions on both left and right ends of the main-body-side terminal unit 251 such that a part of each stepped screw 15 protrudes downward from an opening 13*a* formed in the main-body-side connector supporting unit 13.

Figure 8:
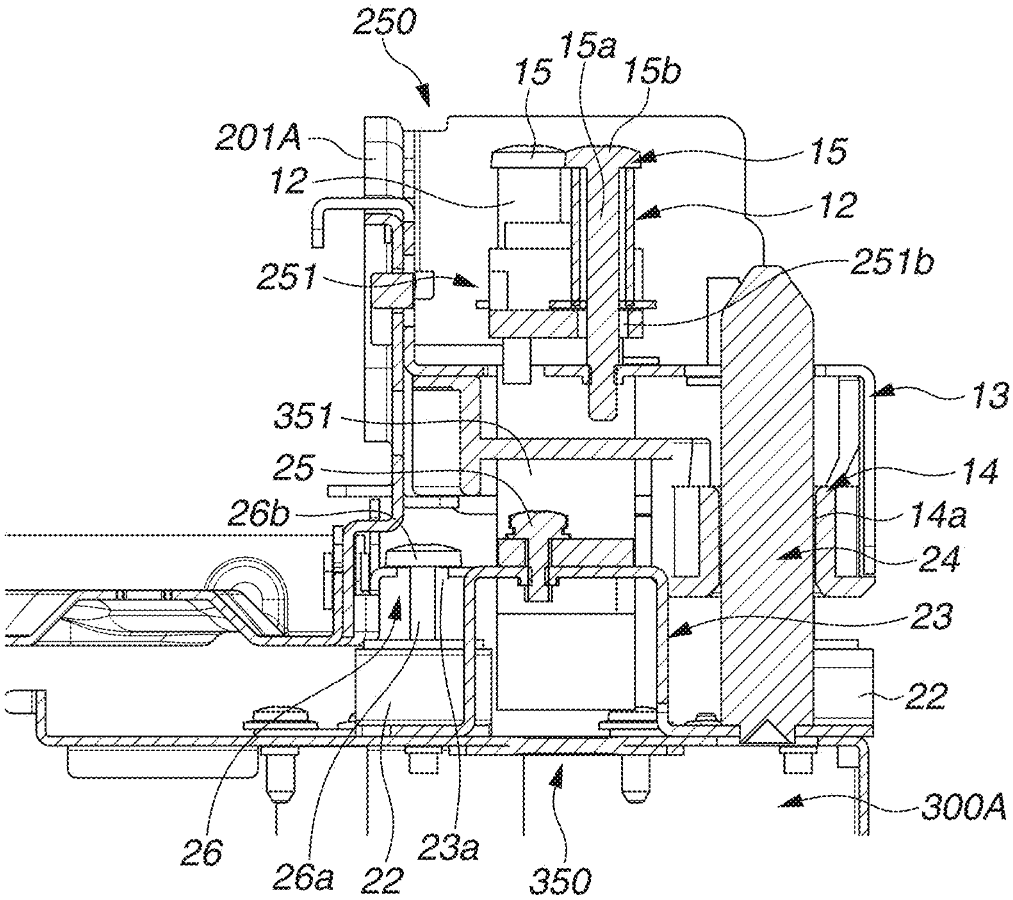
FIG. 8 is a sectional view of the main-body-side connector unit and the unit-side connector unit.

FIG. 8 is a sectional view of the main-body-side connector unit 250 and the unit-side connector unit 350. As illustrated in FIG. 8, the stepped screws 15 are disposed at positions where the stepped screws 15 do not overlap each other when viewed in the left-right direction. That is, the positions of the two stepped screws 15 in the front-rear direction are different from each other. Screw through holes 251*b* through which shaft portions 15*a* of the stepped screws 15 serving as fastening members pass are formed in the main-body-side terminal unit 251.

Each of the shaft portions 15*a* extends in a fitting direction (first direction) in which the main-body-side terminal unit 251 and the unit-side terminal unit 351 can be fitted to each other. The diameter of each of the screw through holes 251*b* is larger than the diameter of the shaft portion 15*a* of the stepped screw 15, and a gap is formed between the screw through hole 251*b* and the shaft portion 15*a* of the stepped screw 15. The gap has a size that allows the main-body-side terminal unit 251 to move in a direction (second direction) that crosses the fitting direction with respect to the main-body-side connector supporting unit 13.

A coil spring 12 serving as a second elastic member (second biasing member) is disposed around the shaft portion 15*a* of each of the stepped screws 15, and one end portion of the coil spring 12 is in contact with a head portion 15*b* of the stepped screw 15. The coil spring 12 provided between the head portion 15*b* (contact portion) and the main-body-side connector supporting unit 13 is disposed to bias the main-body-side terminal unit 251 toward the unit-side connector unit 350 such that the main-body side terminal unit 251 can move in any direction that crosses the fitting direction, specifically, any direction that crosses the shaft portion 15*a*. Alternatively, an elastic annular rubber member may be disposed instead of the coil spring 12.

In addition, the coil springs 12 allow the main-body-side terminal unit 251 to be relatively displaced in the fitting direction with respect to the main-body-side connector supporting unit 13. Thus, the main-body-side terminal unit 251 can also rotate about an optional axis with respect to the main-body-side connector supporting unit 13. As described above, the movement in the present exemplary embodiment includes both the horizontal movement of the main-body-side terminal unit 251 with respect to the main-body-side connector supporting unit 13 and the rotation of the main-body-side terminal unit 251 around a certain axis with respect to the main-body-side connector supporting unit 13. In the case of the rotation, the movement range means a rotation angle range. This definition of the movement is applied not only to the main-body-side terminal unit 251 and the main-body-side connector supporting unit 13 but also to any two members.

A guide part 14 is provided on the main-body-side connector supporting unit 13 at a position on the rear side away from the main-body-side terminal unit 251 such that the guide part 14 does not overlap the main-body-side terminal unit 251 when viewed in the left-right direction. Guide holes 14*a* are formed at two positions spaced apart in the left-right direction in the guide part 14 such that the guide pins 24 disposed on the unit-side connector unit 350 can be inserted and removed.

<Unit-Side Connector Unit>

Figure 7:
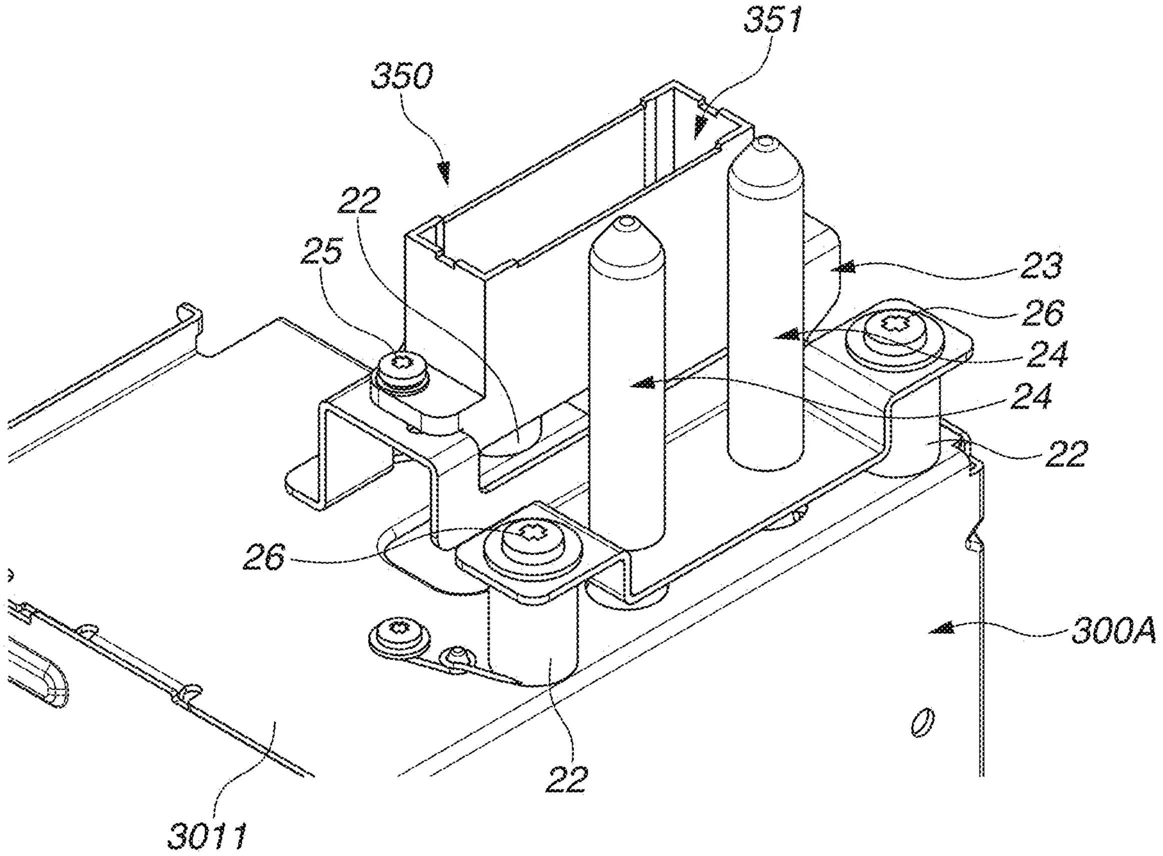
FIG. 7 is an enlarged view of the unit-side connector unit.

Next, the structure of the unit-side connector unit 350 according to the present exemplary embodiment will be described. FIG. 7 is an enlarged view of the unit-side connector unit 350. As illustrated in FIGS. 5 and 7, the unit-side connector unit 350 serving as a first connector unit includes the unit-side terminal unit 351, a unit-side connector supporting unit 23, and the guide pins 24 as positioning members. The unit-side terminal unit 351 serving as a first terminal unit is fixed to the unit-side connector supporting unit 23 with fixing screws 25 disposed at both left and right ends of the unit-side terminal unit 351. The unit-side terminal unit 351 is fitted to and electrically connected to the main-body-side terminal unit 251.

The unit-side connector supporting unit 23 serving as a first supporting unit is attached to the housing 300A with, for example, stepped screws 26 disposed at three positions. The two stepped screws 26 are disposed, for example, at both end portions in the left-right direction on the rear side, and one stepped screw 26 is disposed at the center portion in the left-right direction on the front side. As illustrated in FIG. 8, a screw through-hole 23*a* through which a shaft portion 26*a* of a corresponding one of the stepped screws 26 passes is formed in the unit-side connector supporting unit 23. The diameter of the screw through-hole 23*a* is larger than the diameter of the shaft portion 26*a* of the stepped screw 26, and a gap is formed between the screw through-hole 23*a* and the shaft portion 26*a* of the stepped screw 26.

In the present exemplary embodiment, when the housing 201A and the housing 300A are attached to each other, the housing 300A and the housing 201A may be attached to each other in the fitting direction with any inclination (in a direction that crosses the vertical direction) with respect to the fitting direction (vertical direction) of the housing 300A and the housing 201A in the attached state. For this purpose, the size of the gap between the screw through-hole 23*a* and the shaft portion 26*a* of the stepped screw 26 is set, and a coil spring 22 is disposed between a head portion 26*b* of the stepped screw 26 and the housing 300A. Thus, the coil spring 22 serving as a first elastic member (first biasing member) biases the unit-side connector supporting unit 23 toward the upper main-body-side connector unit 250 such that the unit-side connector supporting unit 23 can swing with respect to a mounting surface 3011 on which the unit-side connector supporting unit 23 is mounted in the housing 300A.

Alternatively, instead of the coil springs 22, elastic annular rubber members may be disposed. In addition, the coil springs 22 allow the unit-side connector supporting unit 23 to be relatively displaced in the fitting direction with respect to the housing 300A. Therefore, the unit-side connector supporting unit 23 can also rotate about any axis with respect to the housing 300A. As described above, this movement includes both horizontal movement and rotation.

The main-body-side terminal unit 251 and the unit-side terminal unit 351 described above each have a plurality of electric contact parts. The main-body-side terminal unit 251 has a convex housing whose side surface part is formed in a convex shape, the side surface part facing the unit-side terminal unit 351 when the main-body-side terminal unit 251 is fitted to the unit-side terminal unit 351. In the convex housing, a plurality of electric contact parts is arranged in parallel in the left-right direction. The unit-side terminal unit 351 has a concave housing whose side surface part is formed in a concave shape, the side surface part facing the main-body-side terminal unit 251 when the unit-side terminal unit 351 is fitted to the main-body-side terminal unit 251. In the concave housing, a plurality of electric contact parts is arranged in parallel in the same direction as the electric contact parts of the main-body-side terminal unit 251.

When the main-body-side terminal unit 251 and the unit-side terminal unit 351 are fitted to each other via the convex housing and the concave housing, the respective electric contact parts are brought into contact and electrically connected to each other. For example, as illustrated in FIG. 9, the main-body-side terminal unit 251 is a male connector having a pin-shaped connection terminal 251*a* serving as an electric contact part. Whereas, the unit-side terminal unit 351 is a female connector having a connection terminal 351*a* serving as an electric contact part. The connection terminal 351*a* has an elastic tip portion that bends on the side of the main-body-side terminal unit 251 and secures electric connection by sandwiching the connection terminal 251*a* of the main-body-side terminal unit 251. A power supply line for supplying power from the image forming apparatus 201 to the sheet storage apparatus 300 and a signal line for transmitting and receiving a control signal are connected to the main-body-side terminal unit 251 and the unit-side terminal unit 351. Examples of the main-body-side terminal unit 251 and the unit-side terminal unit 351 include a drawer connector, for example.

<Guide Pins>

As illustrated in FIGS. 7 and 8, the unit-side terminal unit 351 is fixed to the unit-side connector supporting unit 23, and the guide pins 24 protruding toward the upper main-body-side connector unit 250 are provided on the unit-side connector supporting unit 23. The guide pins 24 are disposed at two positions on the rear side away from the unit-side terminal unit 351 such that the guide pins 24 do not overlap the main-body-side terminal unit 251 when viewed in the left-right direction. The guide pins 24 are inserted into and removed from the guide holes 14*a* in the main-body-side connector unit 250.

FIG. 9 is a sectional view illustrating a state in which the guide pins 24 start to enter the guide holes 14*a* in a case where there is no inclination between the housing 201A and the housing 300A at mounting. In a case where there is no inclination between the housing 201A and the housing 300A at mounting, the fitting direction of the main-body-side terminal unit 251 and the unit-side terminal unit 351 is the same as the direction in which the housing 201A and the housing 300A are mounted on each other. In this case, when the housing 300A and the housing 201A are attached to each other, the three coil springs 22 disposed at the three positions are subjected to the same force and undergo the same compression amount. Thus, the unit-side connector unit 350 is not inclined with respect to the housing 300A.

As illustrated in FIG. 9, when the housing 201A and the housing 300A are attached to each other, tip portions 24*a* of the guide pins 24 enter the guide holes 14*a* of the main-body-side connector unit 250 before the connection terminal 251*a* of the main-body-side terminal unit 251 is inserted into the connection terminal 351*a* of the unit-side terminal unit 351. Subsequently, when the guide pins 24 are appropriately inserted into the guide holes 14*a*, the unit-side connector supporting unit 23 and the main-body-side connector supporting unit 13 are positioned. The guide pin 24 is, for example, a rod-shaped member having a circular cross section, and the tip portion 24*a* has an inclined surface formed in an inclined shape such that the diameter of the tip side of the tip portion 24*a* decreases so as to facilitate insertion of the guide pin 24 into the guide hole 14*a* when the housing 201A and the housing 300A are attached to each other.

Figure 11:
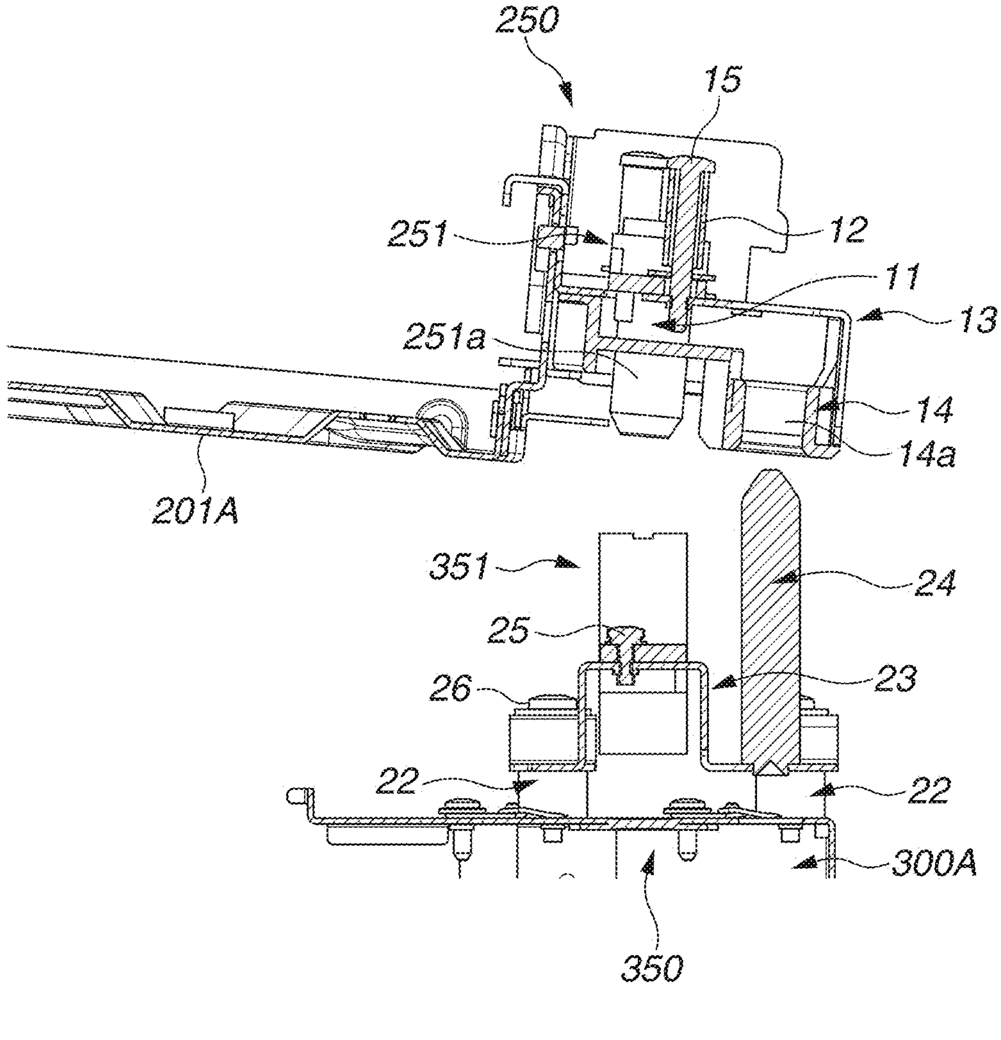
FIG. 11 is a sectional view illustrating a state immediately before the guide pins enter the guide holes in a case where the main body of the image forming apparatus is inclined with respect to the main body of the sheet storage apparatus.
Figure 12:
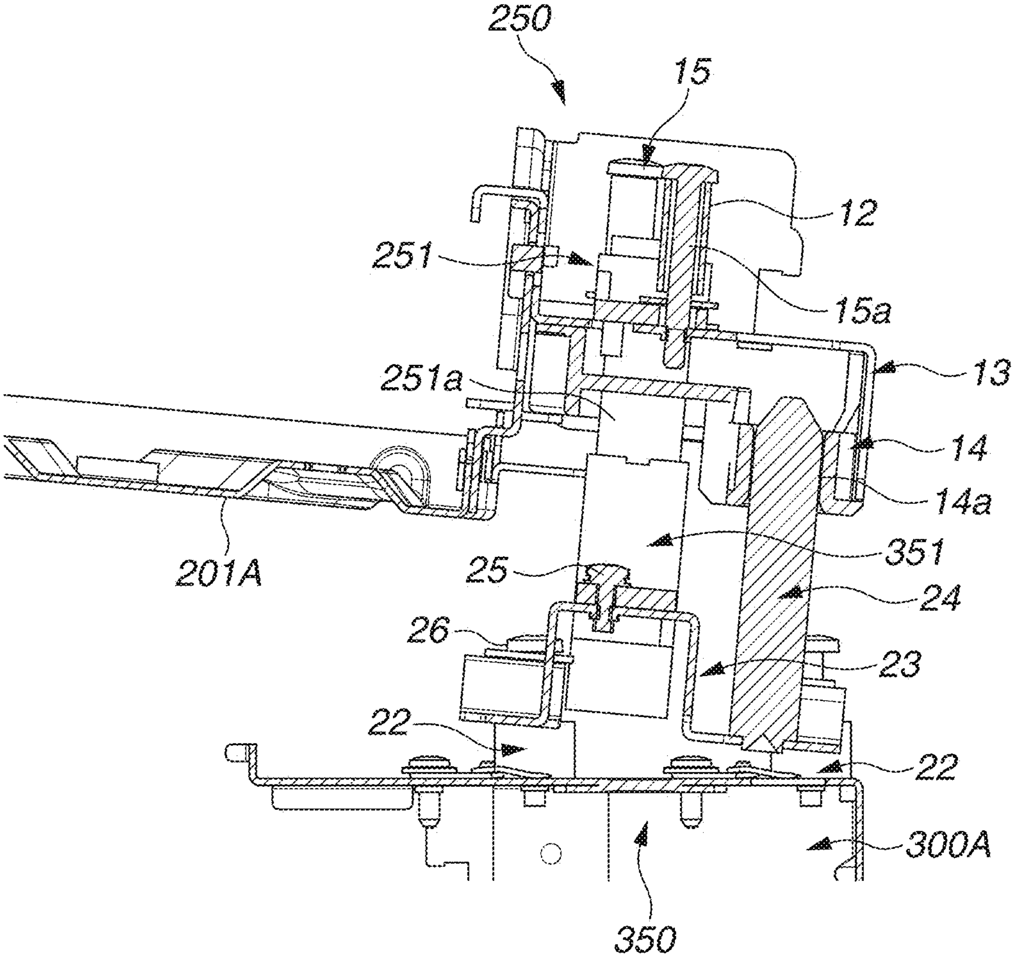
FIG. 12 is a sectional view illustrating a state in which a main-body-side terminal unit starts to be fitted to a unit-side terminal unit, with the main body of the image forming apparatus inclined with respect to the main body of the sheet storage apparatus.

Next, movement of the main-body-side connector unit 250 and the unit-side connector unit 350 when the housing 201A and the housing 300A are attached to each other will be described with reference to FIG. 8 and FIGS. 10 to 12. FIG. 10 is a perspective view illustrating a state immediately before the guide pins 24 enter the guide holes 14*a* in a case where the image forming apparatus main body (housing 201A) is inclined with respect to the sheet storage apparatus main body (housing 300A). FIG. 11 is a sectional view illustrating a state immediately before the guide pins 24 enter the guide holes 14*a* when the image forming apparatus main body is inclined with respect to the sheet storage apparatus main body. FIG. 12 is a sectional view illustrating a state in which the main-body-side terminal unit 251 starts to be fitted to the unit-side terminal unit 351, with the image forming apparatus main body inclined with respect to the sheet accommodating apparatus main body.

When the housing 201A and the housing 300A are attached to each other, there are cases where there is an inclination between the housing 201A and the housing 300A as illustrated in FIG. 10. As described above, since the main-body-side connector supporting unit 13 is fixed to the housing 201A, when there is an inclination between the housing 201A and the housing 300A as illustrated in FIG. 11, the main-body-side terminal unit 251 is inclined with respect to the unit-side terminal unit 351.

When the housing 201A is lowered toward the housing 300A, if the main-body-side terminal unit 251 remains inclined with respect to the unit-side terminal unit 351, the inclination makes it difficult for the guide pins 24 to enter the guide holes 14*a* straight. Consequently, the guide pins 24 are likely to receive a large resistance as the guide pins 24 enter the guide holes 14*a*. As a result, because the connection terminal 251*a* of the main-body-side terminal unit 251 and the connection terminal 351*a* of the unit-side terminal unit 351 receive a larger force than expected, a contact failure between the connection terminals 251*a* and 351*a* could occur or the connectors (250 and 350) could break.

Thus, in the present exemplary embodiment, as described above, the unit-side connector unit 350 is adapted to swing and is inclined with respect to the housing 300A based on the contact between the main main-body-side connector unit 250 and the unit-side connector unit 350. For example, when an external force is applied downward to the unit-side connector unit 350 via the guide pins 24, the unit-side connector unit 350 is moved downward against the biasing force of the coil springs 22, as illustrated in FIG. 12. In this case, depending on the position of the unit-side connector unit 350 to which the external force is applied, the three coil springs 22 disposed at the three positions are subjected to different forces and undergo different compression amounts. Thus, the inclination of the unit-side connector unit 350 changes.

Since the unit-side connector unit 350 is inclined in this way, the guide pins 24 can enter the guide holes 14*a* straight. As a result, because the guide pins 24 are properly inserted into the guide holes 14*a*, the unit-side connector supporting unit 23 and the main-body-side connector supporting unit 13 are positioned.

However, there is a gap between the guide pin 24 and a corresponding guide hole 14*a*. In addition, the placement position of the main-body-side terminal unit 251 in the main-body-side connector supporting unit 13 and the placement position of the unit-side terminal unit 351 in the unit-side connector supporting unit 23 may differ depending on the apparatus. As a result, even when the guide pins 24 are properly inserted into the guide holes 14*a*, there are cases where the unit-side terminal unit 351 and the main-body-side terminal unit 251 are not at positions where the proper fitting can be performed.

In the present exemplary embodiment, the main-body-side terminal unit 251 can move in the vertical direction along the shaft portions 15*a* of the stepped screws 15 against the biasing force of the coil springs 12 and can move in any direction that crosses the shaft portions 15*a* based on the contact between the main-body-side connector unit 250 and the unit-side connector unit 350. In this way, once the guide pins 24 are properly inserted into the guide holes 14*a*, the main-body-side terminal unit 251 and the unit-side terminal unit 351 can be moved to a position where the proper fitting can be performed.

It is desirable that the biasing force (elastic force) of the coil springs 12 that bias the main-body-side terminal unit 251 be larger than the biasing force (elastic force) of the coil springs 22 that bias the unit-side connector supporting unit 23. In this case, when the sheet storage apparatus 300 is mounted on the image forming apparatus 201, even when the main-body-side terminal unit 251 is brought into contact with the unit-side terminal unit 351 with a large force, the main-body-side terminal unit 251 is retracted from the unit-side terminal unit 351. This prevents the connection terminal 251*a* of the main-body-side terminal unit 251 and the connection terminal 351*a* of the unit-side terminal unit 351 from receiving a larger force than expected. Further, when the unit-side terminal unit 351 and the main-body-side terminal unit 251 are positioned at a position where the fitting can be performed, the fitting state between the connection terminal 251*a* of the main-body-side terminal unit 251 and the connection terminal 351*a* of the unit-side terminal unit 351 can be improved.

As described above, according to the present exemplary embodiment, in the unit-side connector unit 350 disposed on the housing 300A, the unit-side connector supporting unit 23 to which the unit-side terminal unit 351 is fixed is provided in a freely swingable manner with respect to the housing 300A by providing the coil springs 22. Whereas, in the main-body-side connector unit 250 disposed on the housing 201A, the main-body-side terminal unit 251 is provided such that the main-body-side terminal unit 251 can move in a direction that crosses the fitting direction with respect to the main-body-side connector supporting unit 13 fixed to the housing 201A by providing the coil springs 12. In this way, when the housing 201A and the housing 300A are attached to each other, the allowable range of the positional deviation between the unit-side terminal unit 351 and the main-body-side terminal unit 251 can be expanded. In particular, when there is an inclination between the housing 201A and the housing 300A, since the unit-side connector supporting unit 23 inclines and the main-body-side terminal unit 251 moves in any direction that crosses the fitting direction, the unit-side terminal unit 351 and the main-body-side terminal unit 251 are easily attached to each other. Accordingly, even when there is a misalignment between the unit-side terminal unit 351 and the main-body-side terminal unit 251 due to an inclination between the housing 201A and the housing 300A at mounting, the misalignment can be corrected, and the unit-side terminal unit 351 and the main-body-side terminal unit 251 can be appropriately fitted to each other.

Other Exemplary Embodiments

The above exemplary embodiment has been described based on an example in which the main-body-side connector unit 250 is disposed on the housing 201A, and the unit-side connector unit 350 is disposed on the housing 300A. However, the above exemplary embodiment is not limited to this example. The main-body-side connector unit 250 may be disposed on the housing 300A, and the unit-side connector unit 350 may be disposed on the housing 201A.

In addition, the above exemplary embodiment has been described based on an example in which the sheet storage apparatus 300 is mounted on the lower side of the image forming apparatus 201 as an additionally attached optional apparatus. However, the present exemplary embodiment is not limited to this example. For example, the present exemplary embodiment may be applied to a case where another type of sheet storage apparatus is mounted as an optional apparatus on the right side of the image forming apparatus 201, a case where a finisher apparatus that performs, for example, a punching process for punching holes in sheets P or a stapling process for binding and stapling a plurality of sheets P is mounted on the left side of the image forming apparatus 201.

According to the above exemplary embodiment of the present disclosure, when the first housing on which the first connector unit is disposed and the second housing on which the second connector unit is disposed are attached to each other, even when there is an inclination between the first housing and the second housing, the first terminal unit of the first connector unit and the second terminal unit of the second connector unit can be appropriately fitted to each other.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-172273, filed Oct. 3, 2023, which is hereby incorporated by reference herein in its entirety.

What is claimed is:

1. An image forming apparatus configured to form an image on a recording material, the image forming apparatus comprising:

a first housing and a second housing connected to each other;

a first connector unit disposed in the first housing and including a first terminal unit and a first supporting unit configured to support the first terminal unit;

a second connector unit disposed in the second housing and including a second terminal unit electrically connected to the first terminal unit by being engaged with the first terminal unit in a first direction and a second supporting unit configured to the second terminal unit;

a first elastic member connected between the first terminal unit and the first supporting unit or between the first supporting unit and the first housing; and a second elastic member connected between the second terminal unit and the second supporting unit or between the second supporting unit and the second housing.

2. The image forming apparatus according to claim 1, wherein the first elastic member includes a first biasing member configured to bias the first supporting unit toward the second connector unit in a manner that the first supporting unit is inclinable with respect to the first housing such that an insertion direction along which the first terminal unit and the second terminal unit are engaging with each other is allowed to inclined with respect to the first direction, and wherein the second elastic member includes a second biasing member configured to bias the second terminal unit toward the first connector unit such that the second terminal is movable in a second direction crossing the first direction with respect to the second supporting unit fixed to the second housing.

3. The image forming apparatus according to claim 2, wherein a biasing force of the second biasing member is larger than a biasing force of the first biasing member.

4. The image forming apparatus according to claim 2, wherein one of the second terminal unit and the second supporting unit includes a shaft portion extending in the first direction, wherein the other of the second terminal unit and the second supporting unit includes a through hole through which the shaft portion passes, and wherein a gap is provided between an edge of the through hole and the shaft portion such that the second terminal unit is movable in the second direction with respect to the second supporting unit.

5. The image forming apparatus according to claim 4, wherein the second biasing member includes a coil spring disposed around the shaft portion, wherein the shaft portion includes a contact portion that is in contact with one end of the coil spring, and wherein the coil spring is provided between the other of the second terminal unit and the second supporting unit and the contact portion.

6. The image forming apparatus according to claim 1, wherein the first supporting unit includes a guide hole, and wherein the second supporting unit includes a positioning member inserted into the guide hole.

7. The image forming apparatus according to claim 1, wherein the second supporting unit includes a guide hole, and wherein the first supporting unit includes a positioning member inserted into the guide hole.

8. The image forming apparatus according to claim 1, wherein an elastic force of the second elastic member is larger than an elastic force of the first elastic member.

9. The image forming apparatus according to claim 1, wherein the first housing is disposed on a lower side of the second housing.

10. The image forming apparatus according to claim 9, comprising:

an image forming unit disposed in the second housing and configured to form the image on the recording material;

a storage unit disposed in the first housing and configured to store the recording material; and a conveying unit disposed in the first housing and configured to convey the recording material stored in the storage unit from the first housing to the second housing.

* * * * *